United States Patent [19]

Ditty et al.

[11] 4,170,174

[45] Oct. 9, 1979

[54] SPIRAL MEAT SLICER

[76] Inventors: Allan V. Ditty, 20644 Maple La.; William B. Shaffer, 1761 Hampton, both of Grosse Pointe Woods, Mich. 48236

[21] Appl. No.: 845,645

[22] Filed: Oct. 26, 1977

[51] Int. Cl.² ........................ A23N 23/00; A23N 7/00

[52] U.S. Cl. ........................................ 99/538; 99/594

[58] Field of Search ................ 99/537, 538, 593, 598, 99/594, 541, 597; 83/411, 425

[56] References Cited

U.S. PATENT DOCUMENTS

| | | | |
|---|---|---|---|
| 3,153,436 | 10/1964 | Chesley | 99/538 |
| 3,951,054 | 4/1976 | Frentzel | 99/538 |
| 4,050,370 | 9/1977 | Schmidt | 99/538 |

*Primary Examiner*—Edward J. McCarthy
*Attorney, Agent, or Firm*—Harry R. Dumont

[57] ABSTRACT

A spiral meat slicer is provided which will form a continuous spiral slice on a piece of meat such as a ham which has a center bone structure which includes a crooked bone of non-uniform diameter.

5 Claims, 7 Drawing Figures

SPIRAL MEAT SLICER

BACKGROUND OF THE INVENTION

In U.S. Pat. No. 3,153,436, a spiral meat slicer is disclosed. The present invention constitutes an improvement over such a spiral meat slicer.

The spiral meat slicer disclosed in the aforementioned patent has proved to be generally satisfactory in service. However, one problem encountered with such spiral meat slicers is that various parts, particularly the structure associated with the knife carriage used, have worn out quite rapidly. It is believed that this has been because of vibration of the meat slicer caused by the reciprocating knife structure used to slice meat, along with alignment problems of such structure. Another problem has been in stopping the slicer after a piece of meat has been sliced. A further problem has been encountered in mounting hams with a bone projecting out of the end. These problems are alleviated in accordance with the present invention.

SUMMARY OF THE INVENTION

The spiral meat slicer is for forming a continuous spiral slice on a cut of meat having an irregularly shaped bone extending therein. The slicer comprises means for mounting the meat with the bone as a substantially vertical axis about which to rotate the meat. A vertically movable carriage is provided. A knife for slicing the meat is mounted on the carriage. The knife is positioned with respect to the axis of rotation of the bone to enable a spiral cut to be made in the meat. Means are provided for longitudinally reciprocating the knife against the meat. Means are provided for automatically tensioning the knife against the meat. Adjustment means are provided for the tensioning means. Further means are provided for rotating the meat, and means are provided for relatively moving the carriage vertically with respect to the meat to advance the knife along the axis of rotation of the meat to form a continuous spiral slice in the meat. Means are provided for limiting upward movement of the carriage. Prong means are provided for mounting the shank end of a ham.

IN THE DRAWINGS

The spiral meat slicer 10 includes five basic elements including means for mounting the meat, means for rotating the meat, reciprocating knife structure, means for tensioning the knife blade against the meat, and means for moving the knife structure upwardly. Further exact details of all of these structures are disclosed in prior United States Patent No. 3,153,346 in connection with which the present invention comprises an improved structure.

Figure 1:
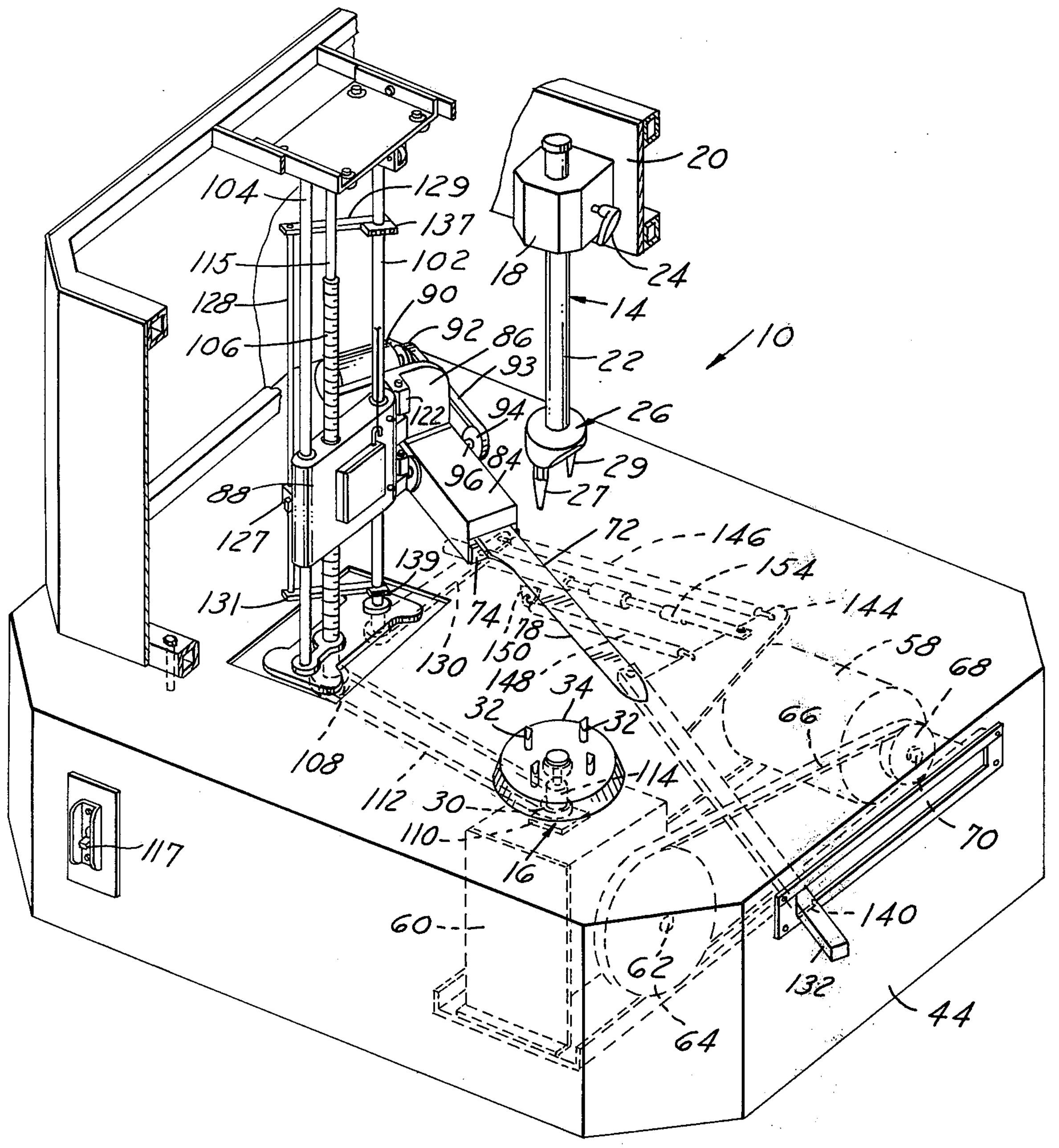
FIG. 1 is a view in perspective of one embodiment of the spiral meat slicer of the present invention, with portions broken away for the purpose of clarity.
Figure 2:
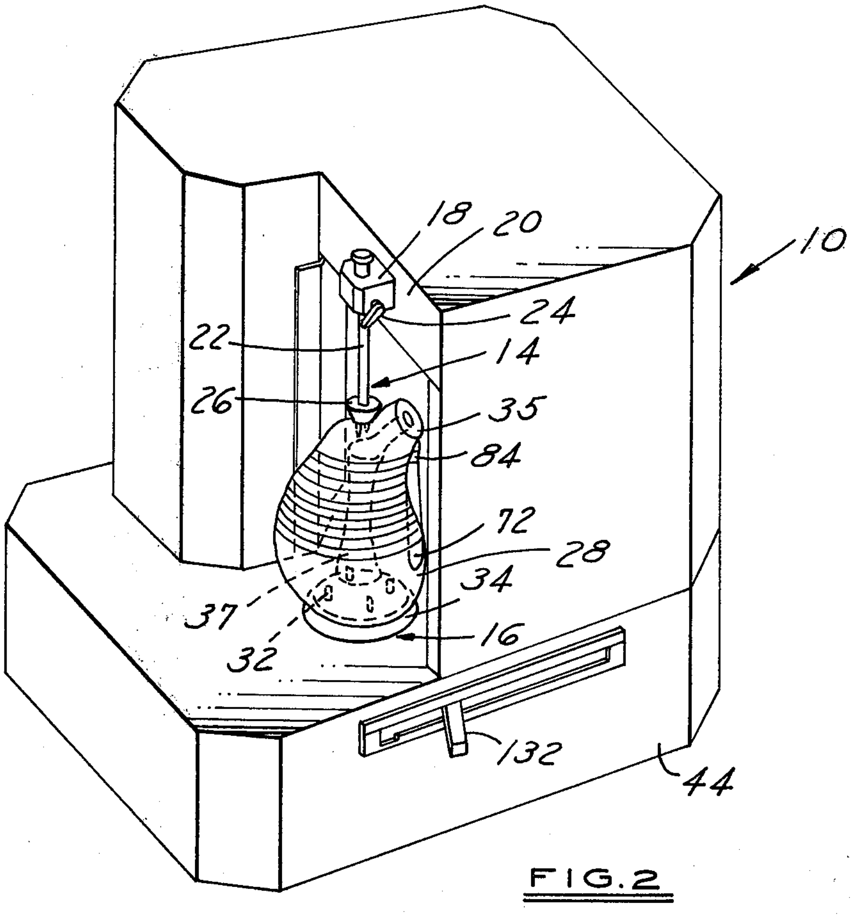
FIG. 2 is a view in perspective of the slicer with a ham mounted thereon.

Referring to FIGS. 1 and 2, the spiral meat slicer 10 has means for mounting the meat which include an upper axially adjustable support 14 and lower rotatably driven support 16. The upper support 14 comprises a bracket 18 having an opening therethrough. The bracket 18 is mounted on a structural member 20. Slidably received in the bracket 18 is an axially adjustable rod 22. The rod 22 is secured in adjusted positions by means of a set screw 24 threadingly received in the bracket 18. A rotatable prong structure 26 is provided on the lower end of the rod 22 to engage a ham 28.

Figure 3:
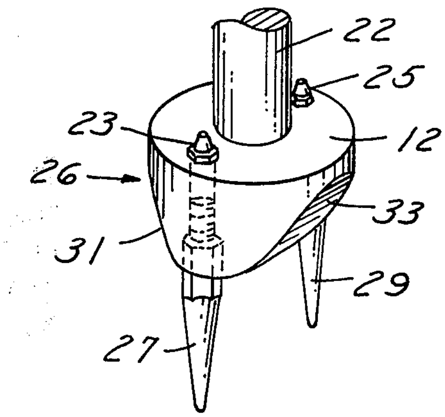
FIG. 3 is a view in perspective of the upper prong structure for holding a piece of meat.

As shown in FIG. 3, the rotatable prong structure 26 is a generally cylindrical body 12 which is rotatably mounted on the lower end of rod 22. A pair of grease or oil fittings 23, 25 are provided for lubricating purposes. A pair of prongs 27, 29 are threadingly engaged on the underside of body 12.

Opposing side portions of the body 12 are cut away at 31, 33 to form radially outwardly angled surfaces extending from the lower section of body 12 towards the upper section thereof. These surfaces define reliefs which permit outwardly angled meat and bone portions of the shank end 35 (FIG. 2) of ham 28 to project by the lower end of body 12 to permit firm engagement of prongs 27, 29 in the meat with the main hambone 37 oriented as a substantially vertical axis for rotation.

The lower rotatably driven support 16 includes a power driven shaft 30 which extends upwardly. Carried on the shaft 30 is a prong structure 32 which engages the lower end of the ham 28. A disc-shaped cover plate 34 is received on the prong structure. The plate 34 provides a sturdy, meat-supporting device.

Referring to FIG. 2, it may be seen that the ham 28 may be mounted between the upper and lower support members 14, 16. In mounting a ham, the butt end of the ham is inserted on the prong structure 32 to a position where the lower end of the ham rests on the plate 34. The leg bone 37 is positioned upright so that the bone forms a substantially vertical axis of rotation for the ham. After the ham has been positioned on the lower support, the upper support is lowered to insert the prong structure 26 into the shank end of the ham. The set screw 24 is then tightened and the ham is in position for slicing.

As previously mentioned, the lower support shaft 30 is power driven. The drive means for the shaft 30 are shown in FIG. 1. The drive mechanism is mounted in a housing 44. Mounted in the housing 44 is an electric motor 58 and a gearbox 60. A shaft 62 extends exteriorly of the gearbox 60 and has mounted on its exterior end a pulley wheel 64. The pulley 64 is connected by a belt 66 to a pulley 68 which is on the output shaft 70 of the motor 58. Actuation of the motor 58 is consequently effective to rotate the gearbox shaft 62. The shaft 30 is connected to one output of the gearbox 60 and is rotatably driven thereby resulting in rotation of the ham 28 mounted between the support structures 14, 16.

The reciprocating knife structure is best seen in FIG. 1. This structure comprises a knife blade 72 which is secured at one end by means of screws to a movable support block 74. The free end of the blade 72 extends to a point beyond the vertical axis of the meat supporting members 14, 16. The blade is preferably oriented to permit it to follow the angle of the helix which it cuts on a piece of meat. This may be accomplished by tilting the blade with respect to the horizontal or by providing a bevel on the underside of the blade 72 extending from the cutting edge 78. In this configuration, the blade must be relatively thick as, for example, one-eighth of an inch. The upper surface of the blade 72 and the surface defined by the bevel form a V-shaped configuration terminating in the cutting edge 78. This V, assuming the upper and lower surfaces of the blade to be oriented substantially in the horizontal plane, results in aiming the apex, or cutting edge 78 of the blade, upwardly in the desired manner to follow the angle of the helix which is cut on the ham 28.

Theoretically, the angle of the blade should be adjusted for each different helix it is desired to cut. However, it has been found in practice that if the blade is oriented to correspond to the generally desired helix, it will perform satisfactorily.

The block 74 is mounted for reciprocal movement in a bracket 84. The bracket is secured on a vertically oriented plate 86. The plate 86 is pivotally mounted on a vertically movable carriage 88. An electric motor 90 is mounted on the reverse side of the plate 86. The output shaft of the motor carries a pulley 92 which is drivingly connected by belt 93 to a pulley 94 mounted on shaft 96. The shaft 96 is operatively connected to a crank and cam structure (not shown) to cause reciprocation of the block 74. As will be appreciated, reciprocal motion of the block 74 will cause the knife blade 72 to reciprocate in a cutting action.

Figure 6:
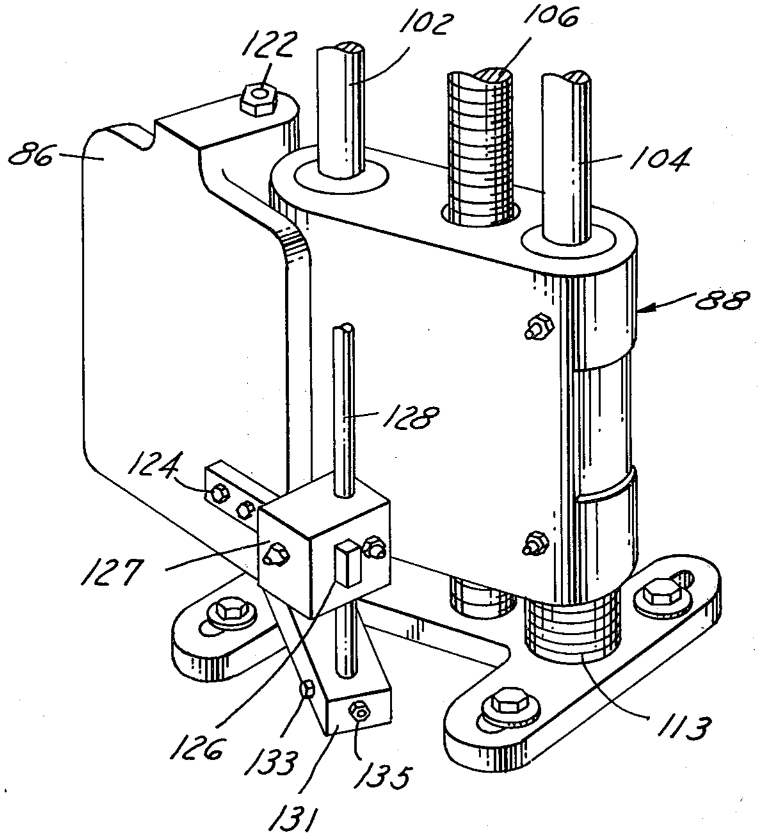
FIG. 6 is a view in perspective of knife carriage structure utilized with the reciprocating knife structure of the meat slicer.

The means for moving the knife blade structure upwardly may best be seen in FIGS. 1 and 6. In FIG. 6, the motor and knife structure are removed for the purpose of clarity. As previously mentioned, the plate 86 which carries the knife blade structure is mounted on the vertically movable carriage 88. The carriage 88 may be conveniently fabricated as a casting. The carriage 88 is mounted for sliding movement on spaced apart vertical guides 102, 104. A vertical worm 106 extends through the carriage 88. The worm 106 is rotatably driven by the motor 58 through the gearbox 60. As may best be seen in FIG. 1, the lower end of the worm carries a sprocket 108. The sprocket 108 is connected to a sprocket 110 by means of a chain 112. Sprocket 110 is mounted on a shaft 114 which extends into the gearbox 60 wherein it is driven.

Figure 5:
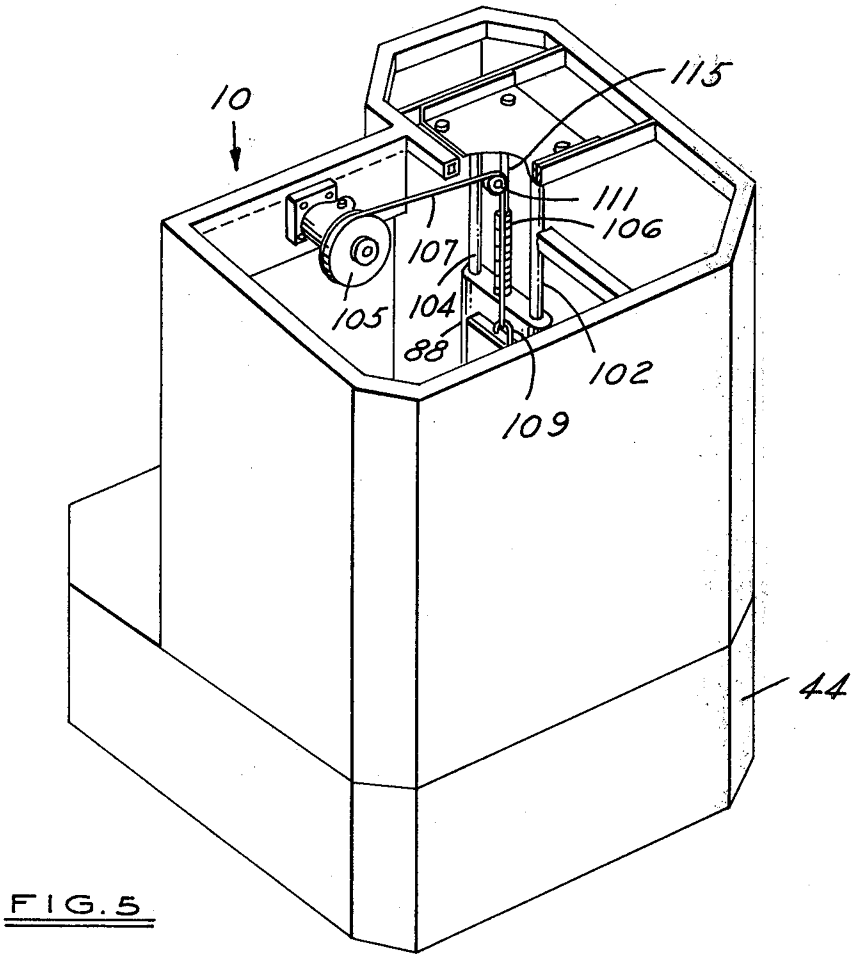
FIG. 5 is a perspective view of the upper portion of the meat slicer.

The worm 106, when rotated, is effective to raise the carriage 88. A worm gear is provided within the carriage to engage the worm 106. The worm gear has an associated clutch mechanism whereby to engage the worm only during periods when it is desired to raise the carriage. The upper end 115 of worm 106 is unthreaded. This is a safety feature which limits upward movement of the carriage 88. In the event the operator does not stop the slicer by actuating switch 117 (FIG. 1) after the meat is sliced, the carriage will rise above the worm threads and upward movement thereof will cease. After the cut of meat has been completely sliced, the clutch is released and the weight of the carriage 88 will cause the carriage to slide down guides 102, 104 to the initial starting position. Downward movement of the carriage is restrained by means of a counterbalance system. As shown in FIG. 5, a spring restrained reel 105 is mounted on the slicer cabinet. A cable 107 is attached to U-shaped element 109 secured to the carriage 88. The cable 107 passes over a pulley 111. Upon raising of carriage 88, the cable is wound onto reel 105 and is slowly unwound upon descent of the carriage. An elastomeric bumper 113 (FIG. 6) is provided on the lower end of guide 104 to cushion the carriage 88 at the end of its descent.

The means for tensioning the knife blade against the meat may be best seen in FIGS. 1, 4, 6 and 7. As previously mentioned, the knife structure is mounted on pivotal plate 86. The plate 86 is pivotally mounted at 122 for pivoting about a vertical axis.

Figure 7:
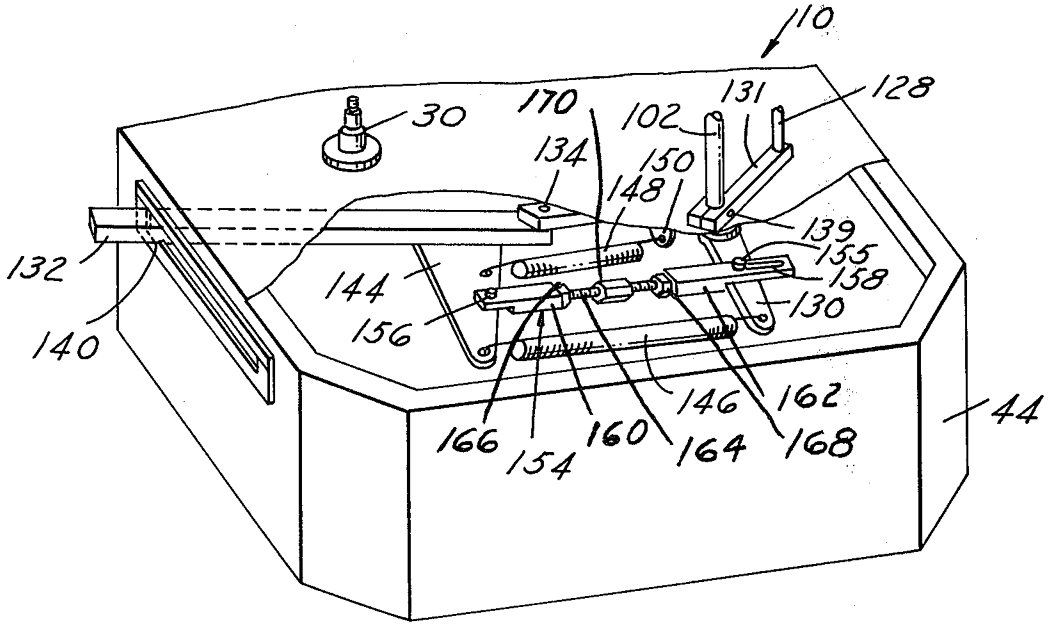
FIG. 7 is another view in perspective of the lower portion of the meat slicer.

As shown in FIG. 6, the plate 86 has a finger 124 secured thereto. The finger 124 is received in a slot 126 of block 127 which slidingly receives a vertical guide rod 128. The rod 128 is fixedly connected by locking screws 133, 135 at its upper and lower ends to horizontally pivotal support structures 129, 131 which in turn are fixedly connected by pins 137, 139 to pivotal guide shaft 102. Referring to FIG. 7, a pivotal arm 130 is keyed to the guide shaft 102.

Figure 4:
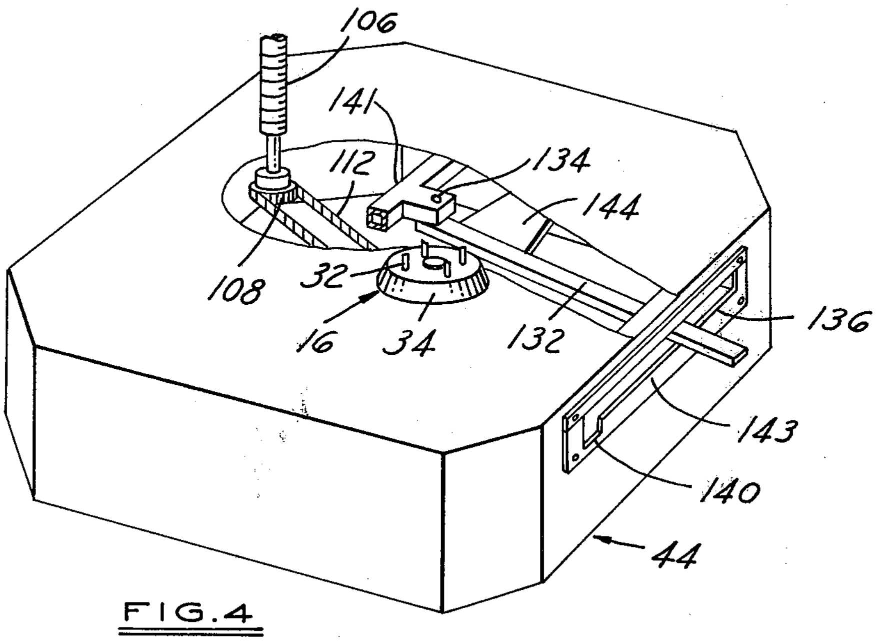
FIG. 4 is a perspective view of the lower portion of the meat slicer.

A manually operable handle structure is provided to cause pivoting of the arm 130. The manual means include an arm 132 which is rotatably mounted on a vertical pin rod 134 and secured to support structure 141 (FIG. 4). The arm 132 is capable of slight up and down pivoting. The arm 132 extends horizontally through an elongated opening 136 provided in the element 143. The arm 132 terminates exteriorly of the slicer construction in a handle portion. The opening 136 includes a downwardly extending detent 140 at one end. The arm 132 normally bears downwardly against the lower edge of the opening 136. When the arm is pivoted to a position over detent 140, it will fall into the detent, thus locking the arm in this pivoted position.

The arm 132 is provided, adjacent its inner end, with an extension 144 which projects outwardly therefrom at substantially right angles. The extension 144 is connected to the arm 130 by means of a spring 146 which extends between the outer ends of these members. A second spring 148 extends from the extension 144 into engagement with a bracket 150 which is secured to a fixed structure. An elongated member 154 is pivotally mounted by a pin 156 to the extension 144. The member 154 has an elongated opening 158 extending longitudinally thereof adjacent the opposite end of the pin 156.

In operation, the arm 132 is manually moved into engagement with the detent 140. This movement causes pivoting of the arm 130 via the member 154. Pivoting of arm 130 causes rotation of the guide 102. Rotation of the guide shaft causes rotation of the rod 128 which is connected thereto. The rod 128, which is slidingly connected to finger 126 carries with it the plate 86 to thus pivot the knife blade 72 towards the ham 28 mounted in the slicer.

Upon initial movement of the arm 132, the spring 146 will tend to stretch out rather than to move the relatively heavy structure associated with the knife blade 72. While the spring 146 will eventually cause movement of the structure, the heavy stress on spring 146 would cause rapid deterioration of the spring. The member 154 is thus provided to effectuate the initial movement of the structure associated with the knife blade. When the arm 132 is moved toward the detent 140, the spring 146 will stretch out until the outer end of opening 158 engages the pin 155 on arm 130. A rigid connection will then be formed between the extension 144 and the arm 130, causing movement of the arm 130. Assuming an average diameter bone, the arm 130 will eventually come to rest with the pin 155 intermediate the ends of opening 158. This position permits the knife blade to move either inwardly or outwardly to the extent of the length of opening 158.

The spring connection of arm 130 with extension 144 permits the arm 130 to move when the force is applied thereto. Consequently, when the knife blade 72 contacts the thick portion of the bone in the meat, it can move outwardly away from the bone. When the bone thins down, the knife will move back towards the center of the cut of meat under the tension of spring 146. Thus, the knife will always cut right up to the bone and is able to cut meat having non-uniform diameter bones such as hams.

Upon release of the arm 132 from detent 140, the return spring 148 will cause the arm 132 to return to its initial position. When the arm 132 has moved a short distance, the inner end of the opening 158 and member 154 will contact pin 155 and thereafter cause rotation of the mechanism associated with the knife blade.

The member 154 is constructed as a turnbuckle for the purpose of adjustment. End portions 160, 162 are connected together by threaded member 164, this member having opposite hand threads at each end. Nuts 166, 168 normally lock the unit in adjusted position. When it is desired to make an adjustment, nuts 166, 168 are loosened and member 164 is rotated by means of wrench engageable element 170 to either lengthen or shorten member 154. The length of member 154 determines the depth which the knife will enter the meat. In previous constructions, this adjustment had been made by loosening members 129, 131 on guide 102, then angularly adjusting rod 128. This led to misalignment of rod 128 with subsequent undue wear on the parts. In the present construction members 129, 131 are pinned in place and no misalignment is possible.

What we claim as our invention is:

1. A spiral meat slicer for forming a continuous spiral slice on a cut of meat having an irregularly shaped bone extending therein comprising means for mounting the meat with the bone as a substantially vertical axis about which to rotate the meat, a vertically movable carriage, a horizontally pivotable support structure pivotably mounted on said carriage, a knife for slicing the meat mounted on said support structure, said knife being positioned with respect to the axis of rotation of the bone to enable a spiral cut to be made in the meat, means for longitudinally reciprocating the knife against the meat, means for rotating the meat, means for relatively moving said carriage vertically with respect to the meat to advance the knife along the axis of rotation of the meat to form a continuous spiral slice in the meat, lever means for moving the knife into slicing engagement with the meat, resilient means interconnecting said lever means with said support structure to yieldingly maintain the knife in contact with the meat bone, a rigid elongated element interconnecting said lever means with said support structure, said rigid element being pivotably connected at one end to one of said lever means and said support structure and slidingly and pivotably connected at the other end to the other of said lever means and said support structure, said sliding connection permitting only limited sliding movement to accomodate variations in bone size, said rigid element including adjustment means to vary the length thereof, said means for relatively moving said carriage vertically with respect to the meat comprising a substantially vertical power driven worm, a freely rotatable worm gear mounted on said carriage in engagement with the worm, said worm having a reduced diameter unthreaded portion proximate the upper end thereof for limiting the extent of upward movement of said carriage after completion of a spiral cut.

2. A spiral meat slicer as defined in claim 1, further characterized in that said adjustment means is a turnbuckle.

3. A spiral meat slicer as defined in claim 1, further characterized in that said sliding connection comprises a slot in one end of said rigid element and a pin extending therein from one of said lever means and support structure.

4. A spiral meat slicer as defined in claim 3, further characterized in that said rigid element is slidingly and pivotably connected to said support structure.

5. A spiral meat slicer as defined in claim 1, further characterized in that said means for mounting the meat includes upper prong structure vertically adjustably mounted on the meat slicer, said prong structure including a body having downwardly projecting prong elements for insertion into a cut of meat, at least one side portion of said body being angled radially outwardly and upwardly from said prong elements to permit passage of a portion of the meat bone past the prong elements to thereby permit the prong elements to be inserted into the meat.

* * * * *